(12) United States Patent
Ishimaru (10) Patent No.: US 8,059,899 B2
(45) Date of Patent: Nov. 15, 2011

(54) IMAGE PROCESSING APPARATUS, IMAGE PROCESSING METHOD, AND COMPUTER PRODUCT

(75) Inventor: Yoshihiro Ishimaru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1059 days.

(21) Appl. No.: 11/902,563

(22) Filed: Sep. 24, 2007

(65) Prior Publication Data

US 2008/0075381 A1 Mar. 27, 2008

(30) Foreign Application Priority Data

Sep. 26, 2006 (JP) ................. 2006-260973

(51) Int. Cl.
*G06K 9/48* (2006.01)
(52) U.S. Cl. ........................................ 382/199
(58) Field of Classification Search ........... 382/181–208
See application file for complete search history.

(56) References Cited

U.S. PATENT DOCUMENTS

| | | | |
|---|---|---|---|
| 6,766,055 B2 * | 7/2004 | Matsugu et al. | 382/173 |
| 2003/0067983 A1 * | 4/2003 | Lee et al. | 375/240.08 |
| 2004/0240749 A1 * | 12/2004 | Miwa et al. | 382/274 |
| 2004/0264772 A1 * | 12/2004 | Une | 382/167 |

FOREIGN PATENT DOCUMENTS

| | | |
|---|---|---|
| JP | 10-150573 A | 6/1998 |
| JP | 2003-179737 A | 6/2003 |

OTHER PUBLICATIONS

Seiki Inoue et al.; "Practical image processing in C language"; 1999; 4.3 Contour extraction using differentiation; pp. 38-52.
Japanese Decision of a Patent Grant mailed on Mar. 1, 2011, issued in corresponding Japanese patent application No. 2006-260973.

* cited by examiner

*Primary Examiner* — Daniel Mariam
*Assistant Examiner* — Elisa Rice
(74) *Attorney, Agent, or Firm* — Westerman, Hattori, Daniels & Adrian, LLP (57) ABSTRACT

An image processing apparatus includes a contour extraction unit and a contour correcting unit. The contour extraction unit ascertains intensity difference between each of the pixels in the original image data and pixels around the pixel, and evaluates sharpness of a contour to determine intensity of a pixel in the contour image data based on gradient of intensity of the pixel. The contour correcting unit shifts a contour of the pixel in a predetermined direction based on a direction of a slant of the gradient of intensity when an absolute value of the gradient of intensity is larger than threshold.

15 Claims, 11 Drawing Sheets

IMAGE PROCESSING APPARATUS, IMAGE PROCESSING METHOD, AND COMPUTER PRODUCT

BACKGROUND OF THE INVENTION

1. Field of the Invention

The present invention relates to an image processing apparatus, an image processing method, and a computer product.

2. Description of the Related Art

In recent years, digital cameras are widely used and digital camera function is installed on a mobile phone terminal as default. Photographs taken by the digital cameras or the digital camera function are normally saved as image data, which does not fade like a photograph printed on a sheet, and can be easily improved by image processing.

One of basic technologies in the field of image processing is contour extraction. The process of contour extraction is necessary to convert an image taken by a digital camera into a hand-drawn image, or to automatically set a range to which effects, such as gradation of color, are added in the image taken by the digital camera. Generally, as described in "Practical image processing in C language" written by Seiki Inoue, Nobuyuki Yagi, Masaki Hayashi, Eisuke Nakasu, and Kouji Mitani, pp 38-50, 1999, published by Ohmsha Ltd., the contour extraction is realized by comparing intensity of each of pixels with intensity of pixels adjacent to the pixel in the image data.

In a conventional contour extraction method, in which intensity of a pixel is compared with that of adjacent pixels, a range of extracted contour is broader than a range of contour that is supposed to be extracted.

When pixels with high intensity and pixels with low intensity are adjacent to each other, it is preferable that the pixels with low intensity alone are extracted as a contour. However, due to difference in intensity among the pixels in a given area, the pixels with high intensity are also extracted as the contour, which makes the contour wider than the one that is supposed to be extracted.

SUMMARY OF THE INVENTION

It is an object of the present invention to at least partially solve the problems in the conventional technology.

According to an aspect of the present invention, there is provided an image processing apparatus that generates contour image data indicative of a contour in original image data. The image processing apparatus includes a calculating unit that calculates intensity difference between each pixel in the original image data and pixels around the pixel; a contour extracting unit that extracts a first pixel as belonging to a contour in the contour image data when an absolute value of intensity difference between intensity of the first pixel and intensity of a second pixel adjacent to the first pixel is larger than a threshold; and a contour correcting unit that corrects the contour based on whether the intensity of the first pixel is larger than the intensity of the second pixel.

According to another aspect of the present invention, there is provided a method of generating contour image data indicative of a contour in original image data. The method includes calculating intensity difference between each pixel in the original image data and pixels around the pixel; extracting a first pixel as belonging to a contour in the contour image data when an absolute value of intensity difference between intensity of the first pixel and intensity of a second pixel adjacent to the first pixel is larger than a threshold; and correcting the contour based on whether the intensity of the first pixel is larger than the intensity of the second pixel.

According to still another aspect of the present invention, there is provided a computer-readable recording medium that stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Explained below is a general outline of an image processing method according to an embodiment of the present invention in comparison with a conventional image processing method. When pixels A to F are lined in one line in image data, it is assumed that intensity of each of the pixels is A>B>C=D<E<F. Explained below is a process of contour extraction.

Figure 8:
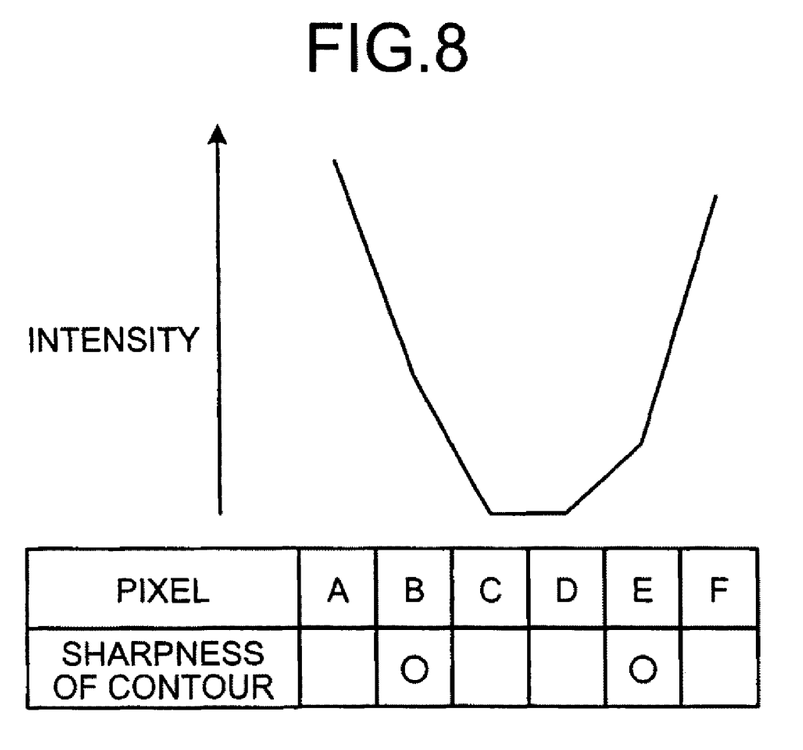
FIG. 8 is a schematic diagram for explaining a conventional image processing method.

FIG. 8 is a schematic diagram for explaining the conventional image processing method. In the conventional image processing method, intensity difference between a pixel and pixels around the pixel is ascertained, and it is assessed that the greater the gradient of intensity in between the pixels, the greater the degree of sharpness of a contour. The term "sharpness of contour" as used herein refers to degree of sharpness of a contour. Therefore, when the pixels A to F are arranged based on their intensity as mentioned above, it is assessed that the sharpness of contour of the pixels B and E positioned in the middle is high.

If the pixels C and D with low intensity are assumed to be a part of a line with a width of two pixels, although the pixels C and D are supposed to form a contour in an image before extraction of contours, an outer region of the pixels C and D is likely to be recognized as the contour according to the conventional method.

Figure 1:
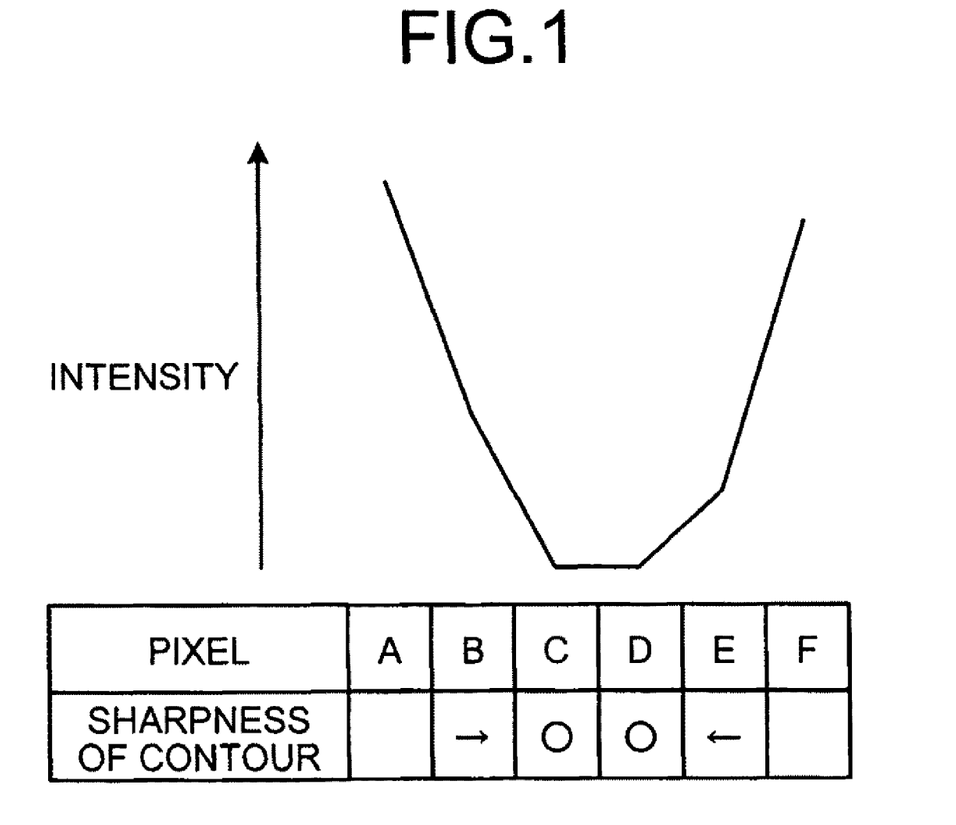
FIG. 1 is a schematic diagram for explaining an image processing method according to an embodiment of the present invention.

FIG. 1 is a schematic diagram for explaining an image processing method according to the embodiment. In the image processing method, once a contour is extracted by the conventional image processing method, a range of the contour is corrected by shifting a sharpness of a pixel with an absolute value of gradient of intensity larger than a threshold in a predetermined direction depending on slant of the gradient of intensity.

When a slant of the gradient of intensity is upward facing (plus), the sharpness of the contour is shifted towards low intensity. On the other hand, when a slant of the gradient of intensity is downward facing (minus), the sharpness of the contour is shifted towards low intensity.

It is assumed that absolute value of gradient of intensity ascertained at the time of assessing the sharpness of the contour of the pixel B is larger than the threshold. Because the slant of the gradient of intensity of the pixel B faces downwards, sharpness of the contour of the pixel B is shifted to the sharpness of the contour of the pixel C, of which intensity is lower than that of the pixel B. Furthermore, it is assumed that absolute value of gradient of intensity ascertained at the time of assessing the sharpness of the contour of the pixel E is larger than the threshold. Because the slant of the gradient of intensity of the pixel E faces upwards, sharpness of the contour of the pixel E is shifted to the sharpness of the contour of the pixel D, of which intensity is lower than that of the pixel D.

As a result of this correction, as shown in FIG. 1, it is determined that the pixels C and D are the pixels with high sharpness of the contour instead of the pixels B and E. Accordingly, the contour of an image, recognized before the process of contour extraction, can be extracted properly. Thus, it is possible to correct the range of the contour to a proper range by shifting sharpness of the contour towards a predetermined direction depending on the slant of the gradient of intensity.

When the sharpness of the contour is shifted in a direction of the pixels with low intensity, in both cases when the slant of the gradient of intensity is upward facing and downward facing, a contour of the part with low intensity can be extracted properly. However, a contour of the part with high intensity becomes wide. On the other hand, when the sharpness of the contour is shifted in a direction of the pixels with high intensity, in both cases when the slant of the gradient of intensity is upward facing and downward facing, it is possible to properly extract a contour of the part with high intensity. However, a contour of the part with low intensity becomes wide.

Generally, when the slant of the gradient of intensity is upward facing, the sharpness of the contour can be shifted towards high intensity, while, when the slant of the gradient of intensity is downward facing, the sharpness of the contour can be shifted towards low intensity. In another case, when the slant of the gradient of intensity is upward facing, the sharpness of the contour can be shifted towards low intensity, while, when the slant of the gradient of intensity is downward facing, the sharpness of the contour can be shifted towards high intensity.

In the above mentioned example, the pixels in the image data are arranged in one dimensional arrangement for easy explanation. However, in the case of actual image data, the pixels are arranged in two dimensional arrangement. Therefore, the gradient of intensity is to be ascertained for each of the pixels in four directions, i.e., X direction, Y direction and two diagonal directions. A contour to be corrected can be determined based on the size of the slant or the shape of an extracted contour, i.e., a contour to be corrected can be determined based on a slant in a near-vertical direction with respect to each contour.

Figure 2A:
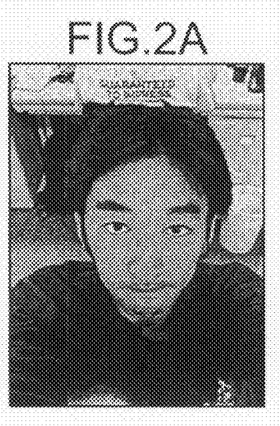
FIG. 2A is an example of image data of a human image.
Figure 2B:
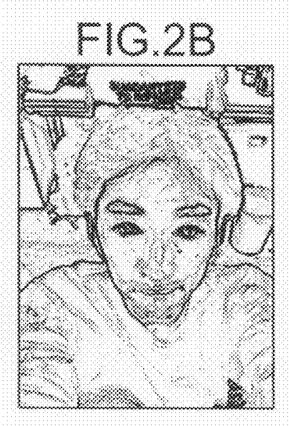
FIG. 2B is an example of contour image data generated through a simple contour extraction process.
Figure 2C:
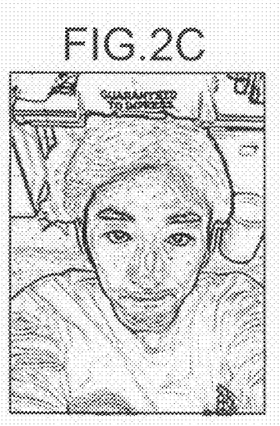
FIG. 2C is an example of contour image data generated in the image processing method.

FIG. 2A is an example of image data of a human image. FIG. 2B is an example of contour image data generated through a simple contour extraction process from the image data shown in FIG. 2A. FIG. 2C is an example of correction of the contour image data generated in FIG. 2B in the image processing method according to the embodiment. When FIGS. 2B and 2C are compared, for example, in the image data depicted in FIG. 2B, a contour of eyes is thick and blurry, whereas in the image data depicted in FIG. 2C, after the correction, a contour of eyes is corrected to an appropriate width.

Figure 3:
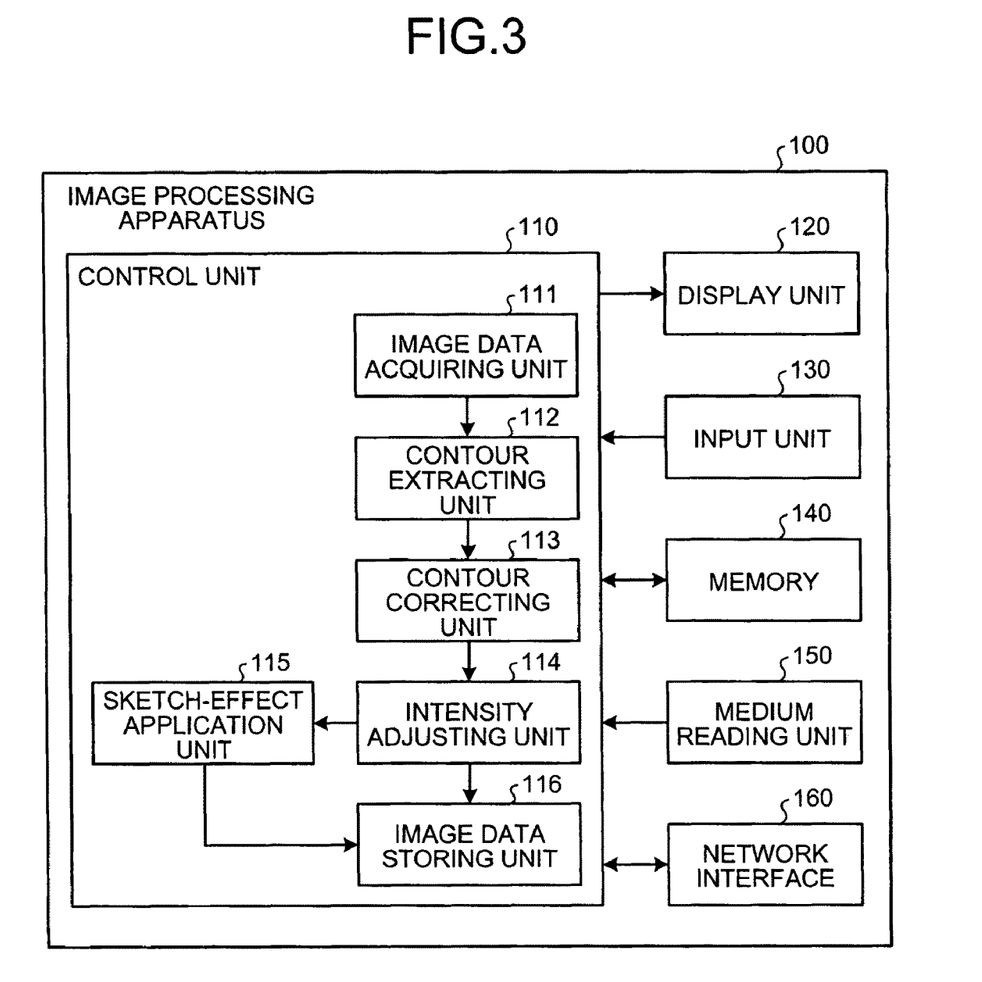
FIG. 3 is a block diagram of an image processing apparatus according to the embodiment.

FIG. 3 is a block diagram of an image processing apparatus 100 according to the embodiment. The image processing apparatus 100 includes a control unit 110, a display unit 120, an input unit 130, a memory 140, a medium reading unit 150, and a network interface 160.

The display unit 120 is a liquid crystal display that displays images, various messages, and the like. The input unit 130 is a keyboard used by a user to input information, such as operating instructions. The memory 140 stores therein image data and the like. The medium reading unit 150 reads the image data from the memory. The network interface 160 exchanges information, such as image data, with other devices that are connected to the image processing apparatus 100 through a network.

The control unit 110 controls the image processing apparatus 100, and includes an image data acquiring unit 111, a contour extracting unit 112, a contour correcting unit 113, an intensity adjusting unit 114, a sketch-effect application unit 115, an image data storing unit 116.

The image data acquiring unit 111 acquires image data to be processed, from the memory 140, the medium reading unit 150, and the network interface 160. The contour extracting unit 112 generates contour image data from the image data acquired by the image data acquiring unit 111.

Specifically, the contour extracting unit 112 converts original image data acquired by the image data acquiring unit 111 into gray scale data. Difference of intensity between each of the gray scaled pixels and pixels around the gray scaled pixel is ascertained, and sharpness of the contour is assessed based on the size of the gradient of intensity to determine intensity of the pixel in the contour image data.

The contour correcting unit 113 corrects the range of the contour in the contour image data by the image processing method mentioned above. Parameters, such as threshold of the absolute value of the gradient, for determining whether to shift the sharpness of the contour, and a direction in which the sharpness of the contour is to be shifted can be set in fixed form in the contour correcting unit 113, in the form of a convertible file in the memory 140, or can be specified by a user using the input unit 130.

The intensity adjusting unit 114 assesses distribution of sharpness in the contour image data corrected by the contour correcting unit 113. Based on the result of the assessment, the intensity of the contour image data is adjusted to obtain balanced image.

The sketch-effect application unit 115 generates sketch-type image data by using the contour image data with intensity adjusted by the intensity adjusting unit 114. Specifically, the sketch-effect application unit 115 corrects the intensity of pixels in the original image data and the gray scale data depending on the level of intensity of each of the pixels in the contour image data that are at a same position as the pixels in the original image data and the gray scale data. After the intensity of the original image data and the gray scale data is made even, contour is accentuated by combining the contour image data and the sketch-type image data, thus completing the process.

The image data storing unit 116 stores therein the contour image data and the sketch-type image data.

Although the image processing apparatus 100 includes processing units that convert the image data to the sketch-type image data using the contour image data, it is possible for the image processing apparatus 100 to include other processing units that use the contour image data.

Figure 4:
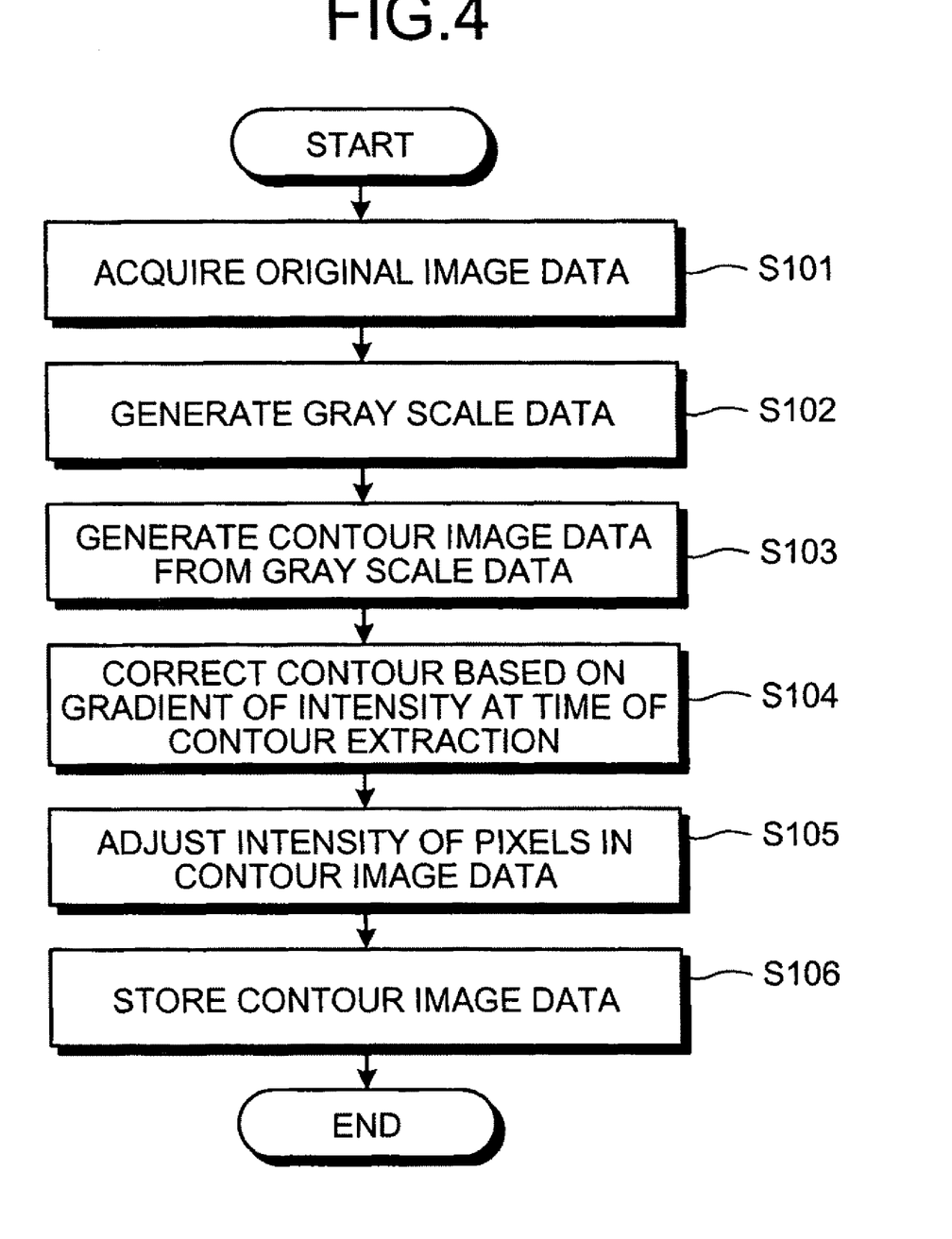
FIG. 4 is a flowchart of a process of generating the contour image data performed by the image processing apparatus shown in FIG. 3.

FIG. 4 is a flowchart of a process of generating contour image data by the image processing apparatus 100. The image data acquiring unit 111 acquires the original image data from the memory 140 (step S101).

The contour extracting unit 112 generates gray scale data from the original image data (step S102). Intensity difference between each of the pixels and pixels around the pixel is ascertained, and a contour is extracted based on the size of the gradient of the intensity to generate contour image data from the gray scale data (step S103). The contour correcting unit 113 corrects the range of the contour in the contour image data based on the gradient of intensity of each of the pixels acquired at the time of contour extraction (step S104). The intensity adjusting unit 114 adjusts intensity of pixels in the contour image data (step S105). The image data storing unit 116 stores contour image data in the memory 140 and the like (step S106).

Figure 2D:
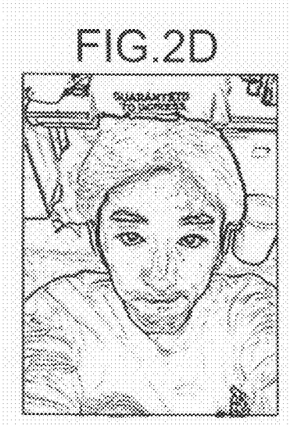
FIG. 2D is an example of the contour image data after intensity of pixels is adjusted.

FIG. 2A is an example of the original image data acquired at step S101. FIG. 2B is an example of the contour image data generated at step S103. FIG. 2C is an example of the contour image data after correction at step S104. FIG. 2D is an example of the contour image data after adjusting the intensity of the pixels at step S105.

Figure 5:
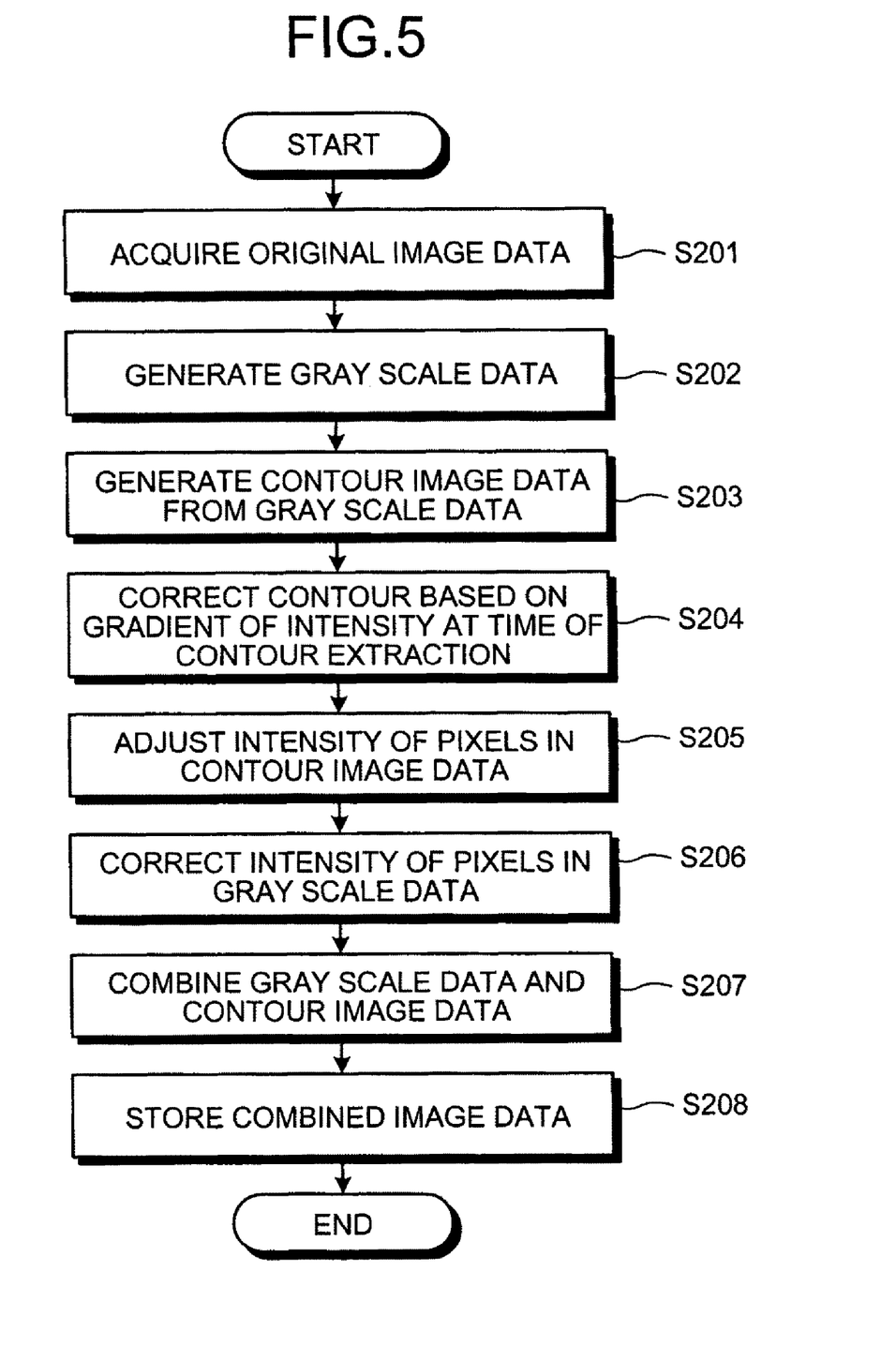
FIG. 5 is a flowchart of a process of generating the sketch-type monochrome image data.

FIG. 5 is a flowchart of a process of generating the sketch-type monochrome image data. Because operations performed at steps S201 to S205 are the same as those at the steps S101 to S105, explanation related to the steps S201 to S205 is omitted.

After the intensity in the contour image data is adjusted, the sketch-effect application unit 115 corrects the intensity of the pixels positioned in the same place as the pixels in the gray scale data, generated at step S202 depending on the level of intensity of the each of the pixels in the contour image data (step S206). The gray scale data and the contour image data is combined with each other (step S207). The image data storing unit 116 stores combined image data in the memory 140 and the like (step S208).

Figure 6:
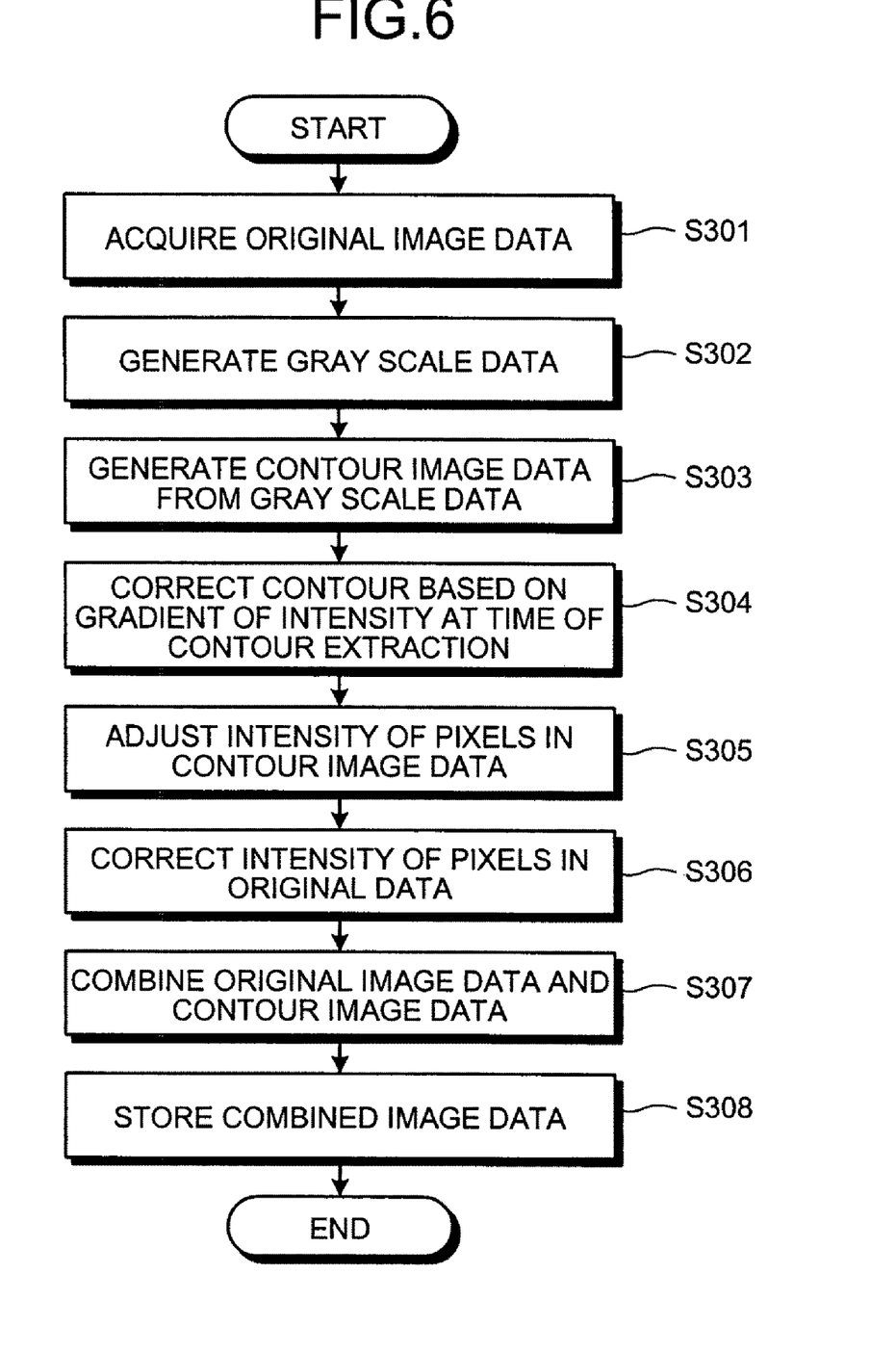
FIG. 6 is a flowchart of a process of generating the sketch-type colored image data.

FIG. 6 is a flowchart of a process of generating the sketch-type colored image data. Because operations performed at steps S301 to S305 are the same as those at the steps S201 to S205, explanation related to the steps S201 to S205 is omitted.

After the intensity in the contour image data is adjusted, the sketch-effect application unit 115 corrects the intensity of the pixels positioned in the same place as the pixels in the original image data acquired at step S301, depending on the level of intensity of the each of the pixel in the contour image data (step S306). The original image data and the contour image data is combined with each other (step S307). The image data storing unit 116 stores the combined image data in the memory 140 and the like (step S308).

Figure 2E:
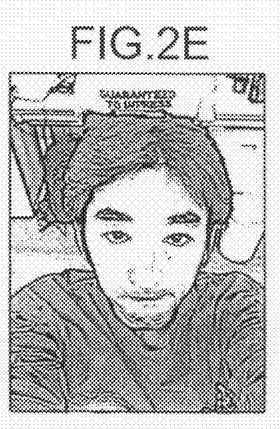
FIG. 2E is an example of sketch-type monochrome image data.
Figure 2F:
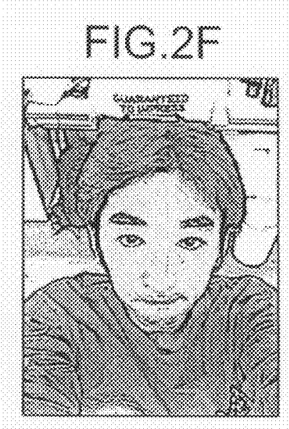
FIG. 2F is an example of sketch-type colored image data.
Figure 11:
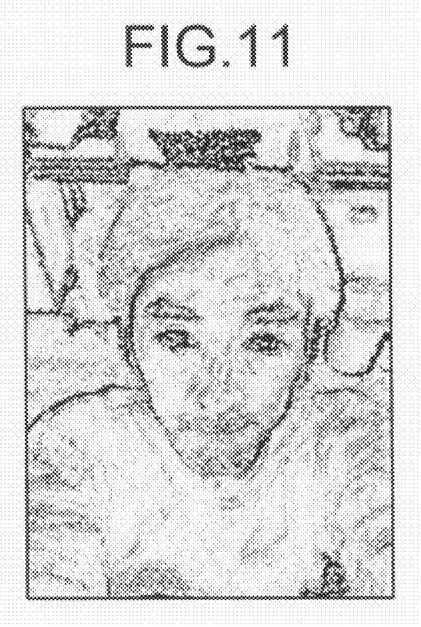
FIG. 11 is an example of sketch-type image data generated by a conventional technology.
Figure 12:
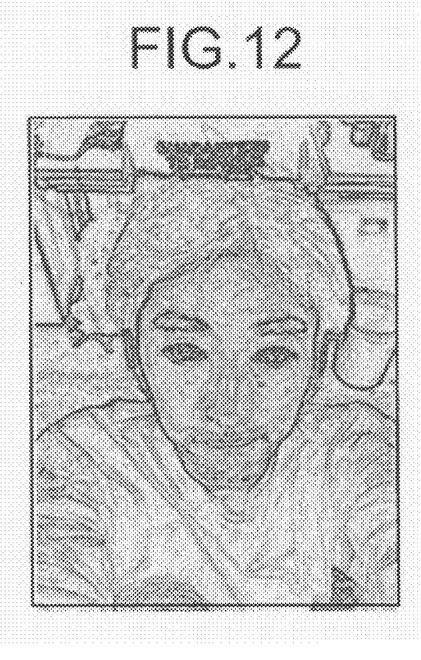
FIG. 12 is an example of sketch-type image data generated by another conventional technology.

FIG. 2E is an example of sketch-type monochrome image data generated at step S207. FIG. 2F is an example of a sketch-type colored image data generated at step S307. When the sketch-type image data is compared with sketch-type image data depicted in FIGS. 11 and 12, it is apparent that contours are of appropriate width and intensity is even all through.

Various changes may be made in the configuration of the image processing apparatus 100 without departing from the scope of the invention. For example, the image processing apparatus 100 can be installed in a digital camera or in a mobile phone with a digital camera.

Functions of the control unit 110 can be implemented as software. In other words, by executing a computer program on a computer, the same function as the image processing apparatus 100 can be realized. Explained below is an example of a computer that executes the computer program (hereinafter, "image processing program 1071").

Figure 7:
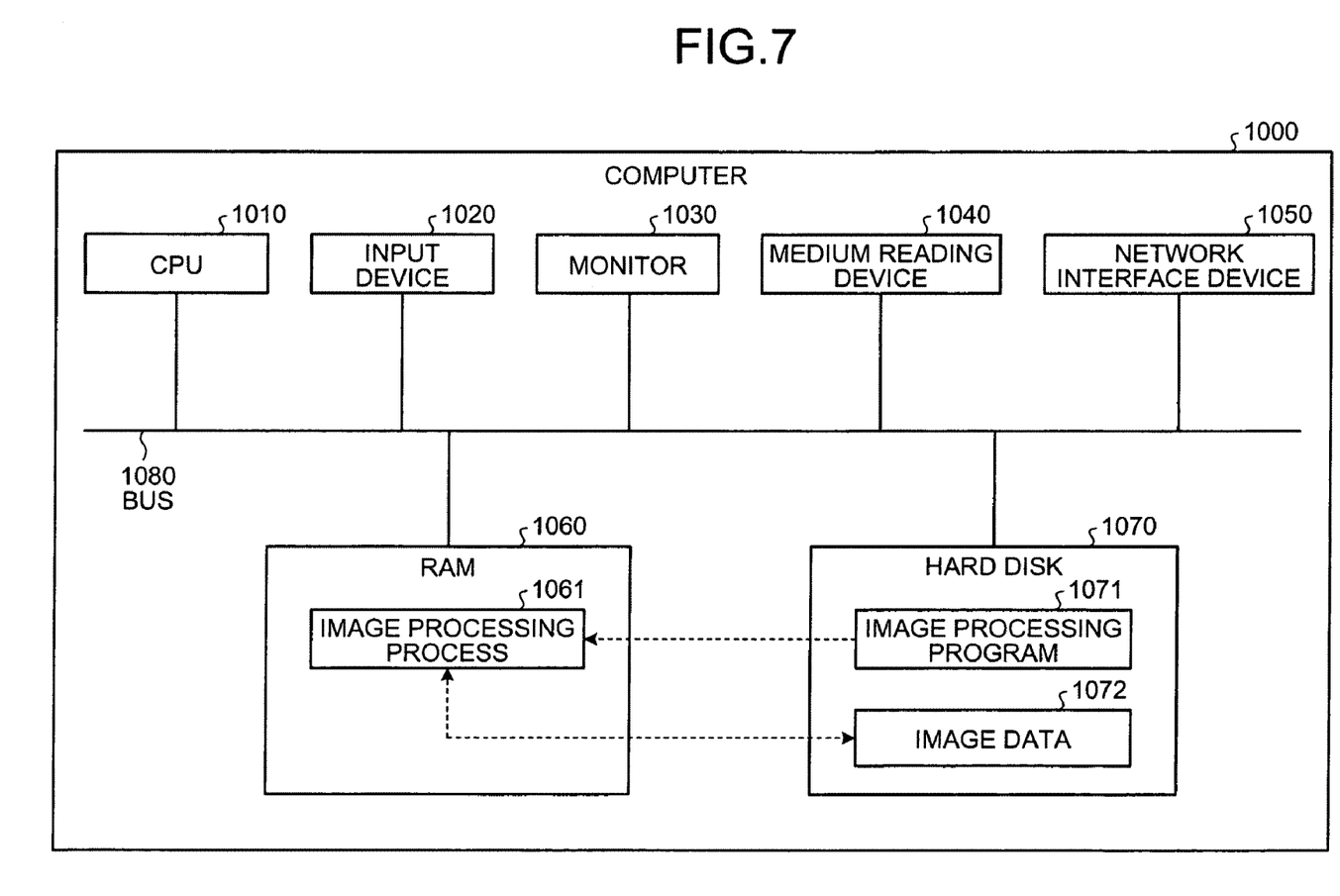
FIG. 7 is a block diagram of a computer that executes an image processing program.

FIG. 7 is a block diagram of a computer 1000 that executes the image processing program 1071. The computer 1000 includes a central processing unit (CPU) 1010, an input device 1020, a monitor 1030, a medium reading device 1040, a network interface device 1050, a random access memory (RAM) 1060, and a hard disk 1070, and a bus 1080 that connects these components. The CPU 1010 executes various programs. The input device 1020 receives data from a user. The monitor 1030 displays information. The medium reading device 1040 reads information, such as programs, from a recording medium. The network interface device 1050 sends and receives data to and from other computers through a network. The RAM 1060 temporarily stores therein various information.

As shown in FIG. 3, the hard disk 1070 stores therein the image processing program 1071 and an image data 1072 that is processed based on the image processing program 1071. The image data 1072 can be stored in another computer that is connected to the computer 1000 via a network.

The CPU 1010 loads the image processing program 1071 from the hard disk 1070 onto the RAM 1060 and executes it, enabling the image processing program 1071 to be executed as an image processing process 1061. By the image processing process 1061, the image data 1072 is read and transferred to an area allocated to the image processing process 1061 in the RAM 1060. Various data processings are executed based on the transferred data.

The image processing program 1071 does not need to be stored in the hard disk 1070, and, for example, can be stored in a storage medium configured to be connected to the computer 1000, such as a compact disc-read only memory (CD-ROM), and can be executed by the computer after reading it. The image processing program 1071 can also be stored in another computer (or a server) connected to the computer 1000 via a network, such as a public line, the Internet, a local area network (LAN), and a wide area network (WAN), and downloaded to the computer 1000.

Figure 9A:
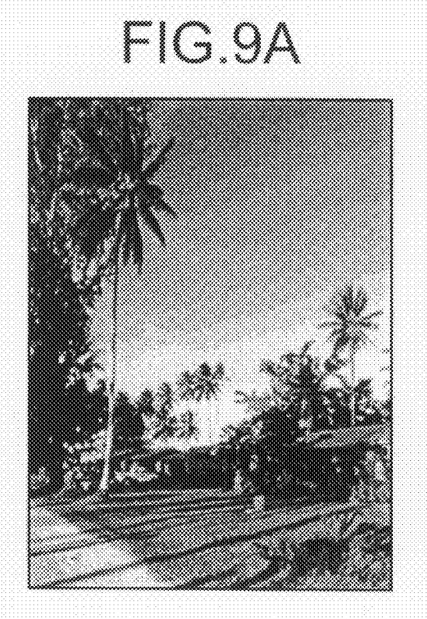
FIG. 9A is an example of landscape image data.
Figure 9B:
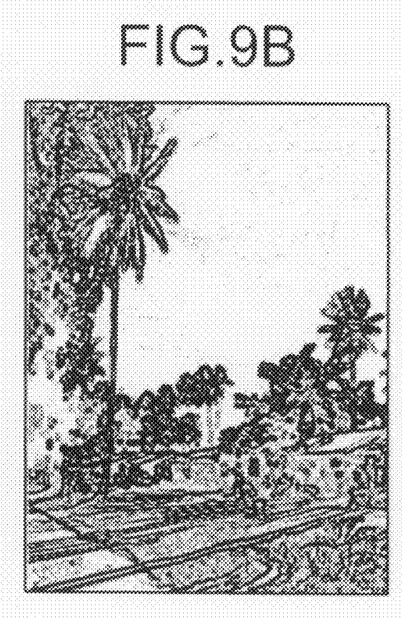
FIG. 9B is an example of contour image data generated through a simple contour extraction process.
Figure 9C:
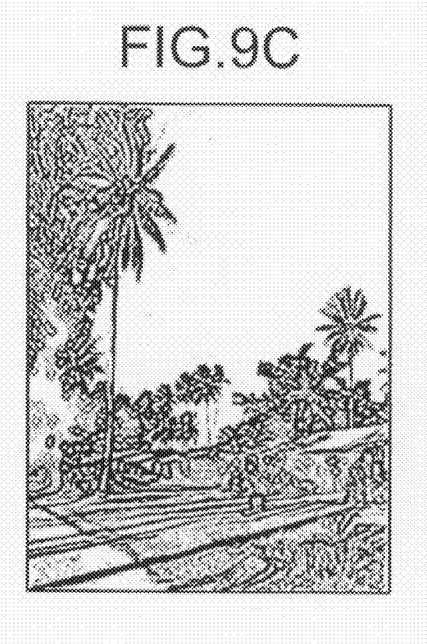
FIG. 9C is an example of contour image data generated in the image processing method.
Figure 9D:
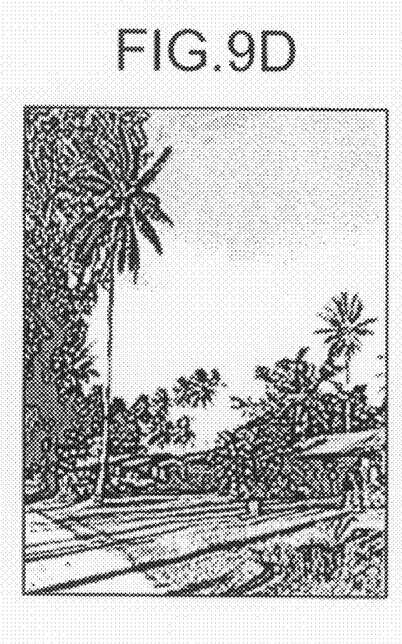
FIG. 9D is an example of sketch-type image data generated in the image processing method.

FIG. 9A is an example of a landscape image data according to the embodiment. FIG. 9B is an example of contour image data generated from the image in FIG. 9A, through a simple contour extraction process. FIG. 9C is an example of the contour image data after the correction of a contour area in the image processing method. FIG. 9D is an example of sketch-type image data generated from the contour image data shown in FIG. 9C.

Figure 10A:
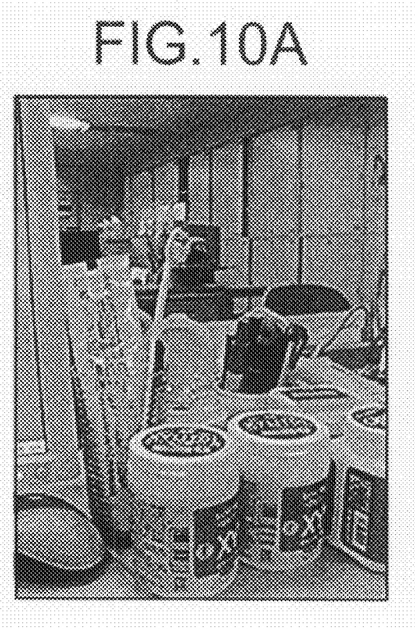
FIG. 10A is an example of image data of a room.
Figure 10B:
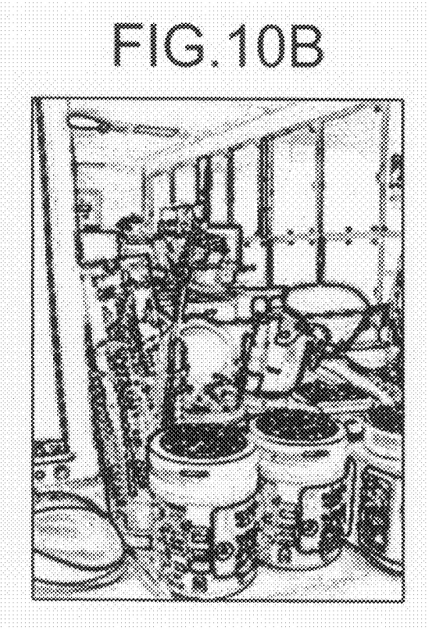
FIG. 10B is an example of contour image data generated through a simple contour extraction process.
Figure 10C:
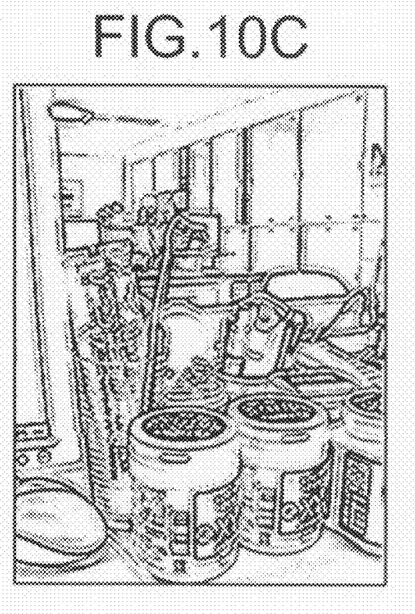
FIG. 10C is an example of contour image data generated in the image processing method.
Figure 10D:
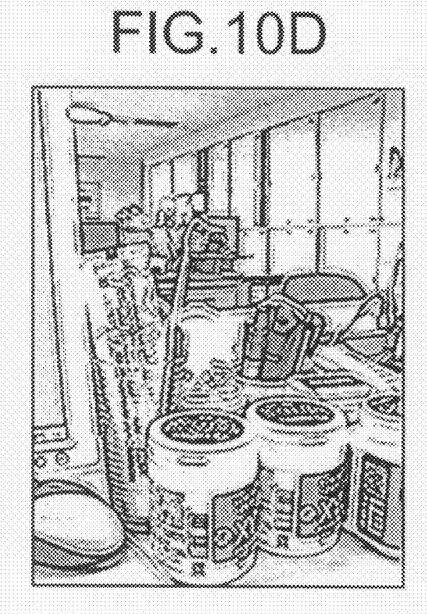
FIG. 10D is an example of sketch-type image data generated in the image processing method.

FIG. 10A is an example of image data of a room according to the embodiment. FIG. 10B is an example of contour image data generated from the image shown in FIG. 10A, through a simple contour extraction process. FIG. 10C is an example of contour image data after the correction of a contour area in the image processing method. FIG. 10D is an example of sketch-type image data generated from the contour image data shown in FIG. 10C.

As described above, the range of the contour in the contour image data is corrected based on the gradient of intensity acquired at the time of contour extraction. Therefore, the range of the contour in the contour image data can be optimized, making it possible to provide the contour image data in desired quality.

In the image processing method according to the embodiment, it is possible to extract contours using comparatively simple logic. Therefore, the image processing method can be used in devices with low processing capacity such as a digital camera and a mobile telephone terminal with a camera.

According to an aspect of the present invention, it is possible to correct the range of a contour in image data based on the gradient of intensity of pixels acquired at the time of contour extraction. Therefore, it is possible to optimize the range of the contour, making it possible to provide image data in desired quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that generates contour image data indicative of a contour in original image data, the image processing apparatus comprising:
   a processor and a memory, wherein the processor is arranged to perform a process comprising
   calculating for each pixel a contour sharpness indicating a degree of sharpness of the contour, based on an intensity gradient between each pixel in the original image data and pixels around the pixel;
   extracting a first pixel as belonging to a contour in the contour image data when the contour sharpness of the first pixel is larger than a threshold; and
   correcting the contour image data by shifting the contour sharpness of the first pixel in a direction depending on a slant of the intensity gradient.

2. The image processing apparatus according to claim 1, wherein the process further comprises:
   adjusting an intensity of an original pixel in the original image data depending on an intensity of a target pixel, at a position corresponding to a position of the original pixel, in the contour image data; and
   generating sketch-type image data by combining the original image data and the contour image data.

3. The image processing apparatus according to claim 1, wherein the process further comprises:
   generating gray scale data from the original image data;
   adjusting an intensity of an original pixel in the gray scale data depending on an intensity of a target pixel, at a position corresponding to a position of the original pixel, in the contour image data; and
   generating sketch-type image data by combining the gray scale data and the contour image data.

4. The image processing apparatus according to claim 1, wherein the correcting includes shifting the contour sharpness from the first pixel to the second pixel when the intensity of the first pixel is lower than the intensity of the second pixel, and shifting the contour sharpness from the first pixel to the second pixel when the intensity of the first pixel is larger than the intensity of the second pixel.

5. The image processing apparatus according to claim 1, wherein the correcting includes shifting the contour sharpness from the second pixel to the first pixel when the intensity of the first pixel is lower than the intensity of the second pixel, and shifting the contour sharpness from the second pixel to the first pixel when the intensity of the first pixel is larger than the intensity of the second pixel.

6. The image processing apparatus according to claim 1, wherein the correcting includes shifting the contour sharpness from the first pixel to the second pixel when the intensity of the first pixel is lower than the intensity of the second pixel, and shifting the contour sharpness from the second pixel to the first pixel when the intensity of the first pixel is larger than the intensity of the second pixel.

7. The image processing apparatus according to claim 1, wherein the correcting includes shifting the contour sharpness from the second pixel to the first pixel when the intensity of the first pixel is lower than the intensity of the second pixel, and shifting the contour sharpness from the first pixel to the second pixel when the intensity of the first pixel is larger than the intensity of the second pixel.

8. A method of generating contour image data indicative of a contour in original image data, the method comprising:
   calculating for each pixel a contour sharpness indicating a degree of sharpness of the contour, based on an intensity gradient between each pixel in the original image data and pixels around the pixel;
   extracting a first pixel as belonging to a contour in the contour image data when the contour sharpness of the first pixel is larger than a threshold; and
   correcting the contour image data by shifting the contour sharpness of the first pixel extracted at the extracting in a direction depending on a slant of the intensity gradient.

9. The method according to claim 8, further comprising:
   adjusting intensity of an original pixel in the original image data depending on an intensity of a target pixel, at a position corresponding to a position of the original pixel, in the contour image data; and
   generating sketch-type image data by combining the original image data and the contour image data.

10. The method according to claim 8, further comprising:
    generating gray scale data from the original image data;
    adjusting an intensity of an original pixel in the gray scale data depending on an intensity of a target pixel, at a position corresponding to a position of the original pixel, in the contour image data; and generating sketch-type image data by combining the gray scale data and the contour image data.

11. The method according to claim 8, wherein the correcting includes shifting the contour sharpness from the first pixel to the second pixel when the intensity of the first pixel is lower than the intensity of the second pixel, and shifting the contour sharpness from the first pixel to the second pixel when the intensity of the first pixel is larger than the intensity of the second pixel.

12. The method according to claim 8, wherein the correcting includes shifting the contour sharpness from the second pixel to the first pixel when the intensity of the first pixel is lower than the intensity of the second pixel, and shifting the contour sharpness from the second pixel to the first pixel when the intensity of the first pixel is larger than the intensity of the second pixel.

13. The method according to claim 8, wherein the correcting includes shifting the contour sharpness from the first pixel to the second pixel when the intensity of the first pixel is lower than the intensity of the second pixel, and shifting the contour sharpness from the second pixel to the first pixel when the intensity of the first pixel is larger than the intensity of the second pixel.

14. The method according to claim 8, wherein the correcting includes shifting the contour sharpness from the second pixel to the first pixel when the intensity of the first pixel is lower than the intensity of the second pixel, and shifting the contour sharpness from the first pixel to the second pixel when the intensity of the first pixel is larger than the intensity of the second pixel.

15. A computer-readable non-transitory recording medium that stores therein a computer program that causes a computer to generate contour image data indicative of a contour in original image data, the computer program causing the computer to execute:
   calculating for each pixel a contour sharpness indicating a degree of sharpness of the contour, based on an intensity gradient between each pixel in the original image data and pixels around the pixel;
   extracting a first pixel as belonging to a contour in the contour image data when the contour sharpness of the first pixel is larger than a threshold; and
   correcting the contour image data by shifting the contour sharpness of the first pixel extracted at the extracting in a direction depending on a slant of the intensity gradient.

* * * * *